US012518494B2

(12) United States Patent
Harvey

(10) Patent No.: US 12,518,494 B2
(45) Date of Patent: Jan. 6, 2026

(54) REAL WORLD OBJECT TAGGING IN DIGITAL TWINS

(71) Applicant: PassiveLogic, Inc., Holladay, UT (US)

(72) Inventor: Troy Aaron Harvey, Brighton, UT (US)

(73) Assignee: PassiveLogic, Inc., Holladay, UT (US)

( * ) Notice: Subject to any disclaimer, the term of this patent is extended or adjusted under 35 U.S.C. 154(b) by 156 days.

(21) Appl. No.: 18/497,141

(22) Filed: Oct. 30, 2023

(65) Prior Publication Data

US 2025/0139910 A1   May 1, 2025

(51) Int. Cl.
*G06T 19/00* (2011.01)
*G06V 10/74* (2022.01)
*G06V 20/20* (2022.01)
*G06V 20/70* (2022.01)

(52) U.S. Cl.
CPC .......... *G06T 19/006* (2013.01); *G06V 10/761* (2022.01); *G06V 20/20* (2022.01); *G06V 20/70* (2022.01); *G06V 2201/07* (2022.01)

(58) Field of Classification Search
None
See application file for complete search history.

(56) References Cited

U.S. PATENT DOCUMENTS

| 12,333,657 | B2* | 6/2025 | Paulson | G06T 19/00 |
| 2016/0284132 | A1 | 9/2016 | Kim et al. | |
| 2020/0160607 | A1* | 5/2020 | Kjallstrom | G06T 19/006 |
| 2021/0241505 | A1* | 8/2021 | Dryer | G06F 3/04845 |
| 2023/0152764 | A1* | 5/2023 | O'Dierno | G05B 17/02 |
| 2023/0169738 | A1* | 6/2023 | Paulson | G06T 19/00 |
| | | | | 345/633 |

OTHER PUBLICATIONS

International Search Report of PCT/US2024/053125, Jan. 10, 2025.
Written Opinion of the International Searching Authority for PCT/US2024/053125, Jan. 10, 2025.

* cited by examiner

*Primary Examiner* — Michael J Cobb

(57) ABSTRACT

Various embodiments relate to a method, apparatus, and machine-readable storage medium including one or more of the following: receiving, from a user, a command to tag an object currently in view of a camera and located within a physical space; in response to the command, determining a distance from a location of the camera to a location of the object; determining the location of the object based on the determined distance; storing the location of the object and a label together as a tag in a digital twin representing the physical space; displaying a representation of the physical space; and displaying an indicator of the tag at a location in the representation of the physical space corresponding to the location of the object.

20 Claims, 8 Drawing Sheets

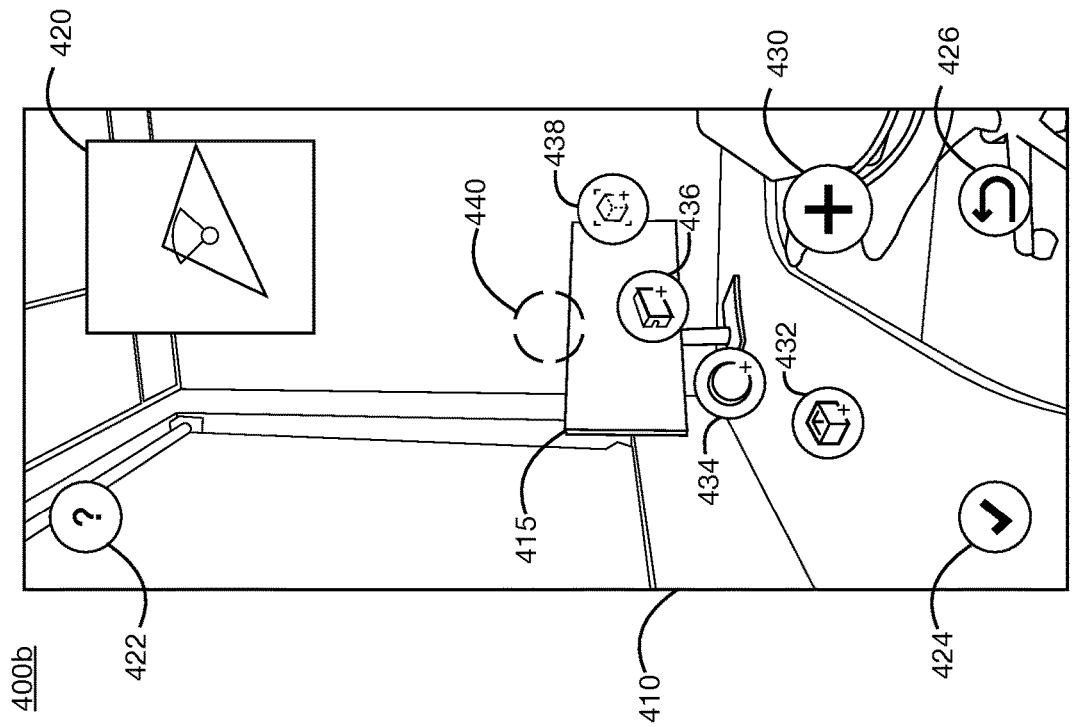
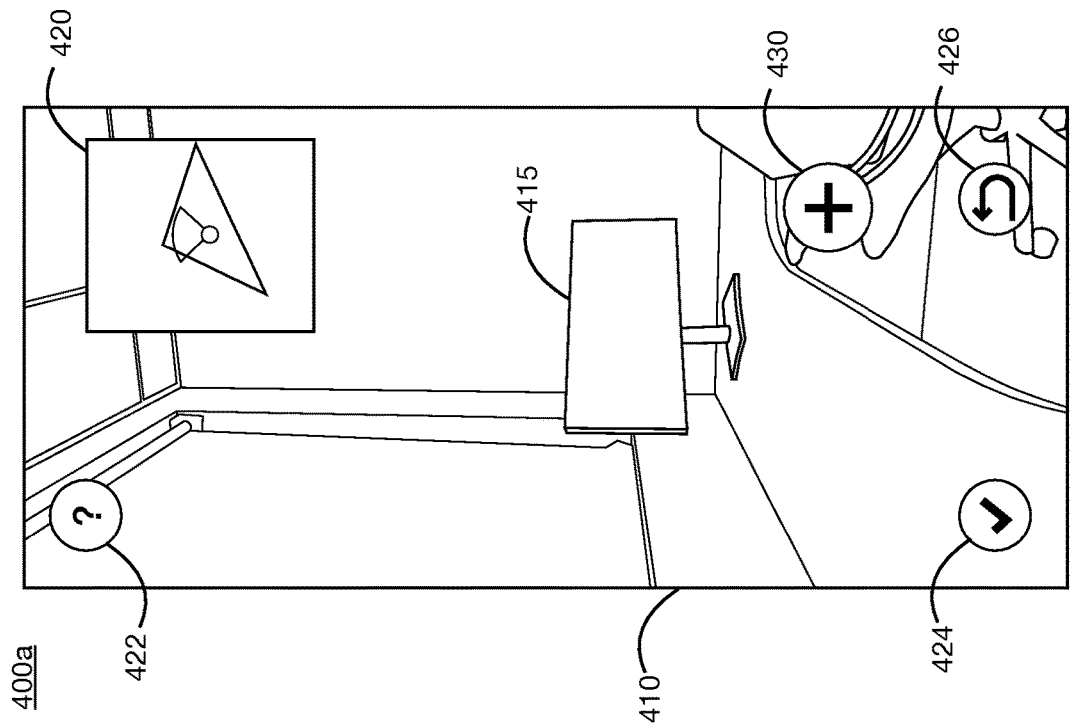
FIG. 4A
FIG. 4B

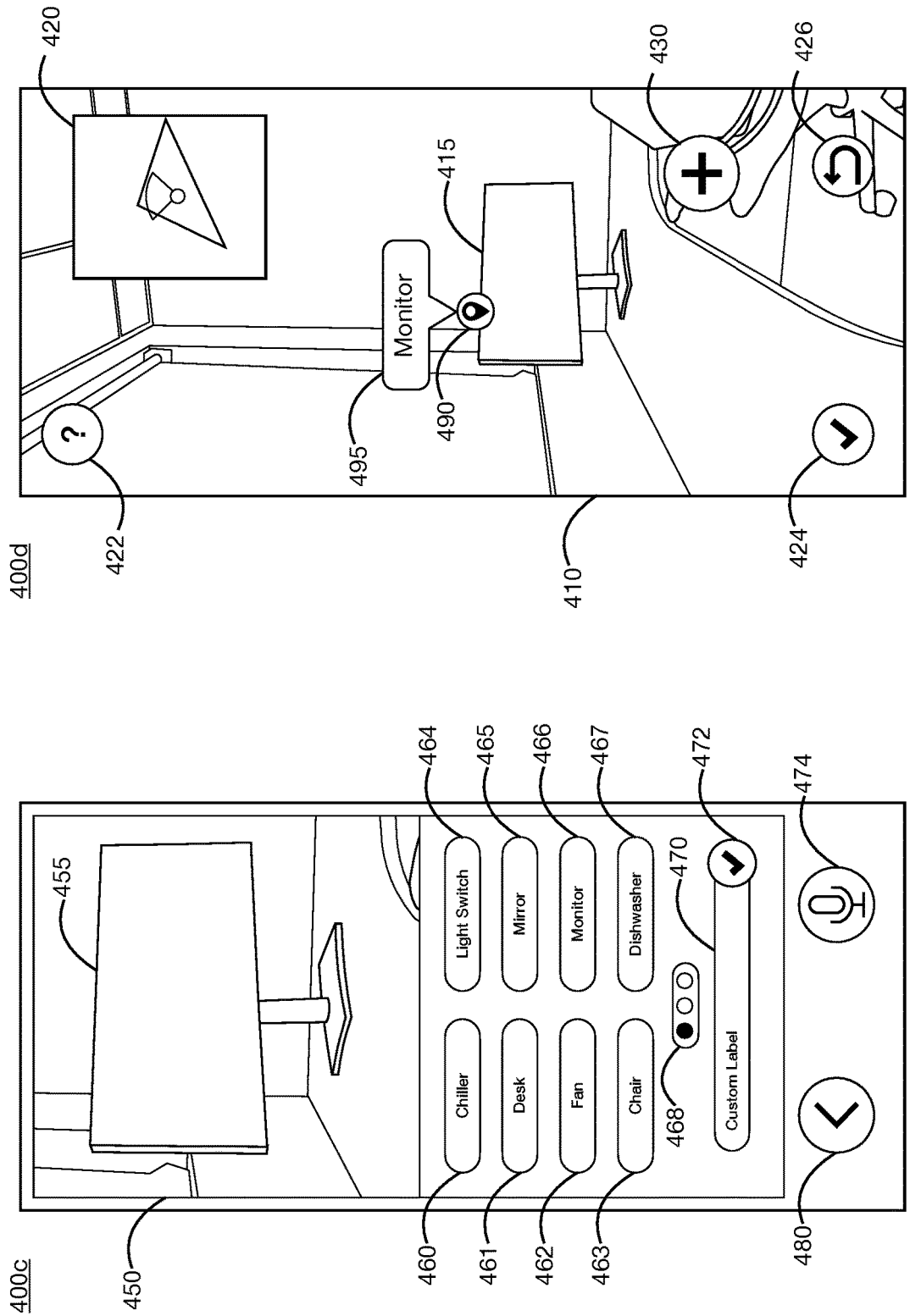

REAL WORLD OBJECT TAGGING IN DIGITAL TWINS

TECHNICAL FIELD

Various embodiments described herein relate to digital twins and more particularly, but not exclusively, to tagging of real world objects during scanning of a structure into a digital twin.

BACKGROUND

While various approaches to capturing a description of a building, whether planned or already built, in digital form exist, the uses for these digital models tend to be limited. In particular, existing building information models may capture the overall layout of a building as well as some standard information, such as wiring and HVAC diagrams, but this is not very extensible to other applications a user may have in mind. On top of that, entry of this information can be onerous, with less-than-intuitive tools for combining the various diagrams of a building into a functional model.

SUMMARY

Accordingly, there exists a need for methods and systems for enabling an untrained user to easily capture any desired information about a building, whether part of the initial construction or added after the fact. This ease of data input enables the creation and maintenance of a more comprehensive digital twin that lends itself to myriad downstream applications. According to various embodiments, an augmented reality method for scanning a building or other physical environments structure into a digital twin is augmented with additional functionality for easily tagging and capturing information about real world objects such as installed equipment, furniture, or inventory. By capturing this information, downstream applications are enabled for, e.g., running queries to locate objects matching particular criteria, tracking movement of objects over time, guiding a user to a desired object's location using augmented reality or other directions, or other applications. Various additional benefits will be apparent in view of the present description.

Various embodiments described herein relate to a method for real-world object tagging performed by a processor, including one or more of the following: receiving, from a user, a command to tag an object currently in view of a camera and located within a physical space; in response to the command, determining a distance from a location of the camera to a location of the object; determining the location of the object based on the determined distance; storing the location of the object and a label together as a tag in a digital twin representing the physical space; displaying a representation of the physical space; and displaying an indicator of the tag at a location in the representation of the physical space corresponding to the location of the object.

Various embodiments described herein relate to a device for real-world object tagging, including one or more of the following: a user interface; a camera; a depth sensor; a memory storing a digital twin representing a physical space; and a processor configured to: receive, via the user interface, a command to tag an object currently in view of the camera and located within the physical space; in response to the command, determine a distance from a location of the camera to a location of the object using the depth sensor; determine the location of the object based on the determined distance; store the location of the object and a label together as a tag in the digital twin; display a representation of the physical space; and display an indicator of the tag at a location in the representation of the physical space corresponding to the location of the object.

Various embodiments described herein relate to a non-transitory machine-readable medium encoded with instructions for execution by a processor for real-world object tagging performed by a processor, the non-transitory machine-readable medium including one or more of the following: instructions for receiving, from a user, a command to tag an object currently in view of a camera and located within a physical space; instructions for in response to the command, determining a distance from a location of the camera to a location of the object; instructions for determining the location of the object based on the determined distance; instructions for storing the location of the object and a label together as a tag in a digital twin representing the physical space; instructions for displaying a representation of the physical space; and instructions for displaying an indicator of the tag at a location in the representation of the physical space corresponding to the location of the object.

Various embodiments are described wherein the representation of the physical space is a live image captured by the camera.

Various embodiments are described wherein the representation of the physical space is a rendering of the digital twin.

Various embodiments additionally include in response to the command, capturing an image from image data produced by the camera; and storing the image in the digital twin together with the location of the object and the label.

Various embodiments are described wherein: the digital twin includes a graph of a plurality of nodes; and storing the location of the object and a label together as a tag in a digital twin representing the physical space includes: identifying a node of the plurality of nodes corresponding to at least one of: an area of the physical space within which the object is located, and a structure of the physical space with which the object is in contact, storing the tag in association with the identified node.

Various embodiments additionally include performing a scanning process including: obtaining depth data from the physical space, and translating depth data to structure data for storage in the digital twin; wherein: the scanning process is paused during the steps of determining the location and storing the tag in the digital twin, and the scanning process is resumed after the step of storing the tag in the digital twin.

Various embodiments are described wherein displaying the indicator of the tag includes displaying at least one piece of information previously associated with the tag in the digital twin by a separate device having access to the digital twin.

BRIEF DESCRIPTION OF THE DRAWINGS

In order to better understand various example embodiments, reference is made to the accompanying drawings, wherein:

FIG. 4A illustrates a first example user interface scene for scanning an environment;

FIG. 4B illustrates a second example user interface scene for receiving a user tag command;

FIG. 4C illustrates a third example user interface scene for tagging an object;

FIG. 4D illustrates a fourth example user interface scene for displaying an indication of a tag;

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
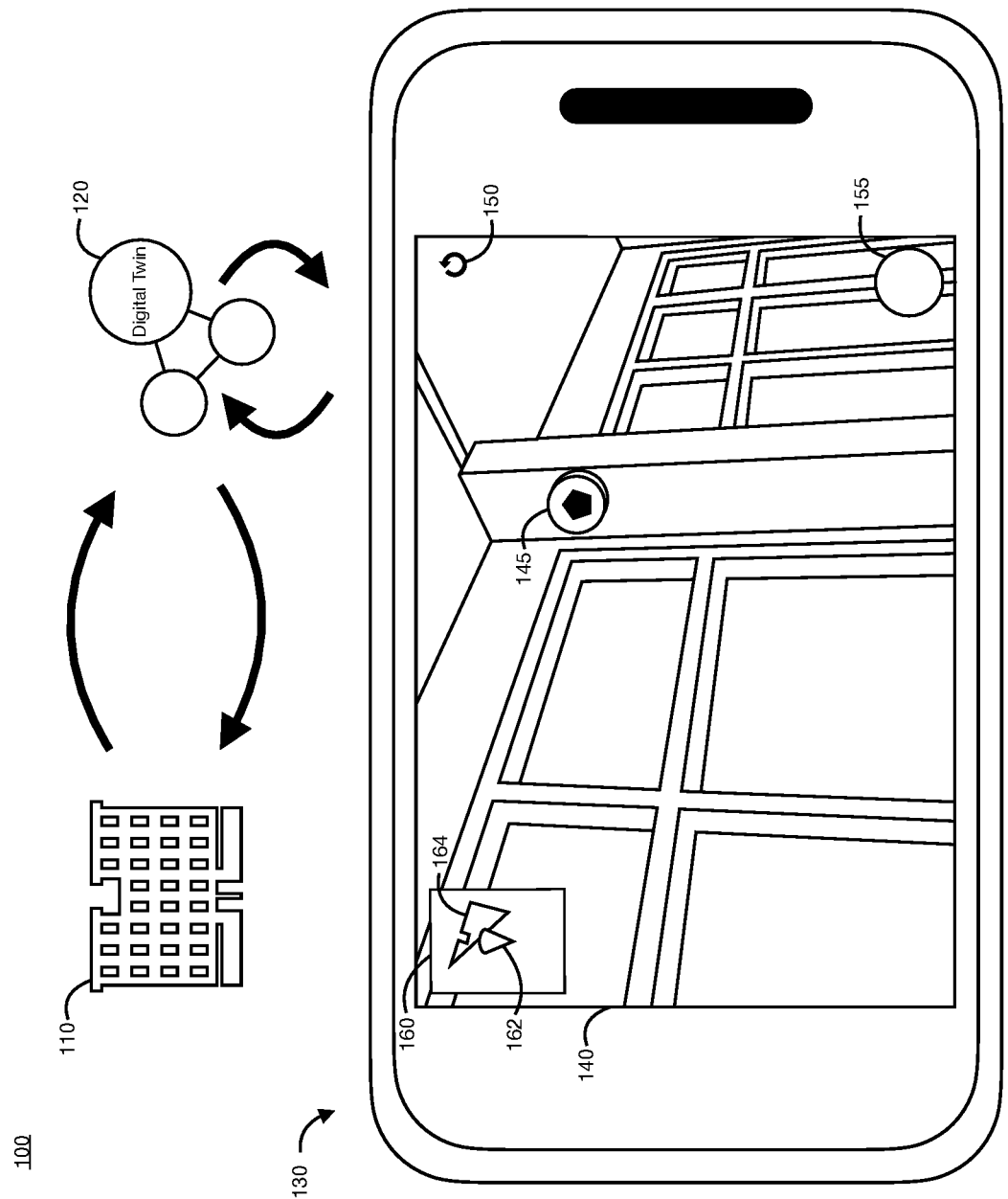
FIG. 1 illustrates an example system for implementation of various embodiments.

FIG. 1 illustrates an example system 100 for implementation of various embodiments. As shown, the system 100 may include an environment 110, at least some aspect of which is modeled by (or to be modeled by) a digital twin 120. The digital twin 120, in turn, interacts with a digital twin mobile suite 130 for providing a user with various means for interaction with the digital twin 120 such as creating or modifying the digital twin 120, using the digital twin 120 to commission devices deployed in the environment 110, or transmitting a copy of the digital twin 120 to one or more other devices. According to one specific set of examples, the environment 110 is a building while the digital twin 120 models various aspects of that building such as, for example, the building structure, its climate conditions (e.g., temperature, humidity, etc.), and a system of controllable heating, ventilation, and air conditioning (HVAC) equipment.

While various embodiments disclosed herein will be described in the context of such an HVAC application or in the context of building design and analysis, it will be apparent that the techniques described herein may be applied to other applications including, for example, applications for controlling a lighting system, a security system, an automated irrigation or other agricultural system, a power distribution system, a manufacturing or other industrial system, or virtually any other system that may be controlled. Further, the techniques and embodiments may be applied other applications outside the context of controlled systems or environments 110 that are buildings. Virtually any entity or object that may be modeled by a digital twin may benefit from the techniques disclosed herein. Various modifications to adapt the teachings and embodiments to use in such other applications will be apparent.

The digital twin 120 is a digital representation of one or more aspects of the environment 110. In various embodiments, the digital twin 120 is implemented as a heterogenous, omnidirectional neural network. As such, the digital twin 120 may provide more than a mere description of the environment 110 and rather may additionally be trainable, computable, queryable, and inferencable, as will be described in greater detail below. In some embodiments, one or more processes continually, periodically, or on some other iterative basis adapts the digital twin 120 to better match observations from the environment 110. For example, the environment 110 may be outfitted with one or more temperature sensors that provide data to a building controller (not shown), which then uses this information to train the digital twin to better reflect the current state or operation of the environment. In this way, the digital twin is a "living" digital twin that, even after initial creation, continues to adapt itself to match the environment 110, including adapting to changes such as system degradation or changes (e.g., permanent changes such as removing a wall and transient changes such as opening a window).

Various embodiments of the techniques described herein may use alternative types of digital twins to the heterogenous neural network type described in most examples herein. For example, in some embodiments, the digital twin 120 may not be organized as a neural network and may, instead, be arranged as another type of model for one or more components of the environment 110. In some such embodiments, the digital twin 120 may be a database or other data structure that simply stores descriptions of the system aspects, environmental features, or devices being modeled, such that other software has access to data representative of the real world objects and entities, or their respective arrangements, as the software performs its functions.

The digital twin mobile suite 130 may provide a collection of tools for interacting with the digital twin such as, for example, tools for creating and modifying the digital twin 120; tools for using the information provided by the digital twin 120 to commission devices deployed in the environment (e.g., to activate, test, or verify the proper installation of such devices); or tools for storing the digital twin 120 (or portions thereof) to make the digital twin 120 available to other devices that may have use for it. It will be understood that while the mobile suite 130 is depicted here as a single user interface provided via a mobile device, that the mobile suite 130 includes a mix of hardware and software, including software for performing various backend functions and for providing multiple different interface scenes (such as the one shown) for enabling the user to interact with the digital twin 120 in different ways and using different tools and applications in the mobile suite 130. Further, while various embodiments are described with respect to the mobile suite 130 being implemented on a mobile device such as a mobile phone or tablet, various alternative embodiments may implement some or all of the mobile suite 130 on a non-mobile device. For example, the majority of functionality of the mobile suite 130 may be implemented on a stationary computer (e.g., a personal computer or a server) while a camera, lidar scanner, flashlight, or other supporting hardware may be provided as part of a different device that may be manipulated by the user for performing supporting mobile activities (e.g., scanning a room or performing short-range communication with a device) and communicating information back to the stationary device implementing the mobile suite 130.

As shown, the digital twin mobile suite 130 currently displays an interface screen for providing a user access to and interaction with a building scanning application. This building scanning application may be used for various purposes such as for capturing a floorplan of a building for conversion to a new digital twin or for updating an existing digital twin. For example, by scanning the walls of a room, the specific geometry of that room (or other descriptive information) can be captured and modeled in the digital twin. As such, the scanning application may also be used as a digital twin creator, to capture the structure of an existing building 110 in the digital twin 120, so that the digital twin 120 can be used by other applications (including those provided by the digital twin mobile suite 130 or by other external applications such as a controller that autonomously controls the HVAC or other controllable system of the environment 110).

The digital twin mobile suite's 130 current interface scene includes a live view 140 of the user's surroundings. In particular, a camera of the device may capture a live image and the mobile suite may display this live image on a screen of the device. In some such embodiments, as the user moves the device in space, the portion of the surrounding environment displayed in the live view 140 may change to show whatever the camera is currently capturing. Various enhancements to the live view 140 may be implemented such as augmented reality elements (e.g., grid lines overlaid on the detected geometry, coloring to illustrate already-captured geometry, etc.). The live view 140 may also enable user inputs such as, for example, allowing a user to virtually "mark" a wall, door, window or other feature to help instruct the scanning application how to interpret the image and other data being gathered for creating or modifying the digital twin 120.

As shown, the live image 140 currently captures an image of a sensor device 140, which may be a device that the mobile suite 130 can commission. As used herein, the term "commission" will be understood to encompass a collection of activities encompassing any subset of activating, testing the operation of, and verifying the proper installation of a device. The displayed scanning application may switch to a commissioning application to commission the sensor device upon, e.g., manual user request or automatically based on proximity to the device to be commissioned.

The digital twin mobile suite's 130 current interface scene also includes a number of interface elements for enabling user interaction or providing additional information to the user. A back button 150 may allow the user to indicate that the mobile suite 130 should return to a previous interface scene (e.g., a scene from which the current view of the scanning application was launched). A menu button 155 may enable the user to indicate that a menu of additional buttons (not shown) should be expanded for additional selection and activation of tools associated with the scanning application. For example, the menu accessible via the button 155 may provide tools for beginning a scan of a new room, beginning a scan of a new floor, switching to a commissioning or other application, adding or labeling objects to the digital twin at the current location (e.g., sensor devices, controllers, or even generic objects that the user can tag with a captured image or other descriptive information).

A minimap 160 may also be overlaid on the live view 140 for guiding the user in completing a scan. The minimap 160 includes a view cone 162 for indicating a user's (or, more accurately, the device's) current position and orientation relative to a currently-scanned floorplan 164. In some embodiments, the view cone 162 may be stationary, always pointing "up" relative to the interface as the in-progress floorplan 164 rotates to indicate orientation. In other embodiments, the view cone 162 may rotate to display user orientation (e.g., relative to north) while the in progress floorplan does not rotate and merely pans within the minimap window to track the user as they walk through the environment. Various other arrangements will be apparent.

The in-progress minimap 164 may display a current state of the room as captured by the scanning application or as is currently committed in the digital twin 120. As shown, the in-progress minimap shows that only two walls, perpendicular to each other, have been partially captured. As more of the current room is scanned, the in-progress minimap may update to show more of the scanned perimeter of the room until the full perimeter has been captured. In some embodiments, other previously-scanned (or captured in the digital twin 120 via other means) rooms may be also shown as part of the in-progress minimap 164.

It should be apparent from the foregoing description that various example embodiments of the invention may be implemented in hardware or firmware. Furthermore, various example embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a mobile device, a tablet, a server, or other computing device. Thus, a machine-readable storage medium may include read-only memory (ROM), random-access memory (RAM), magnetic disk storage media, optical storage media, flash-memory devices, and similar storage media.

Figure 2:
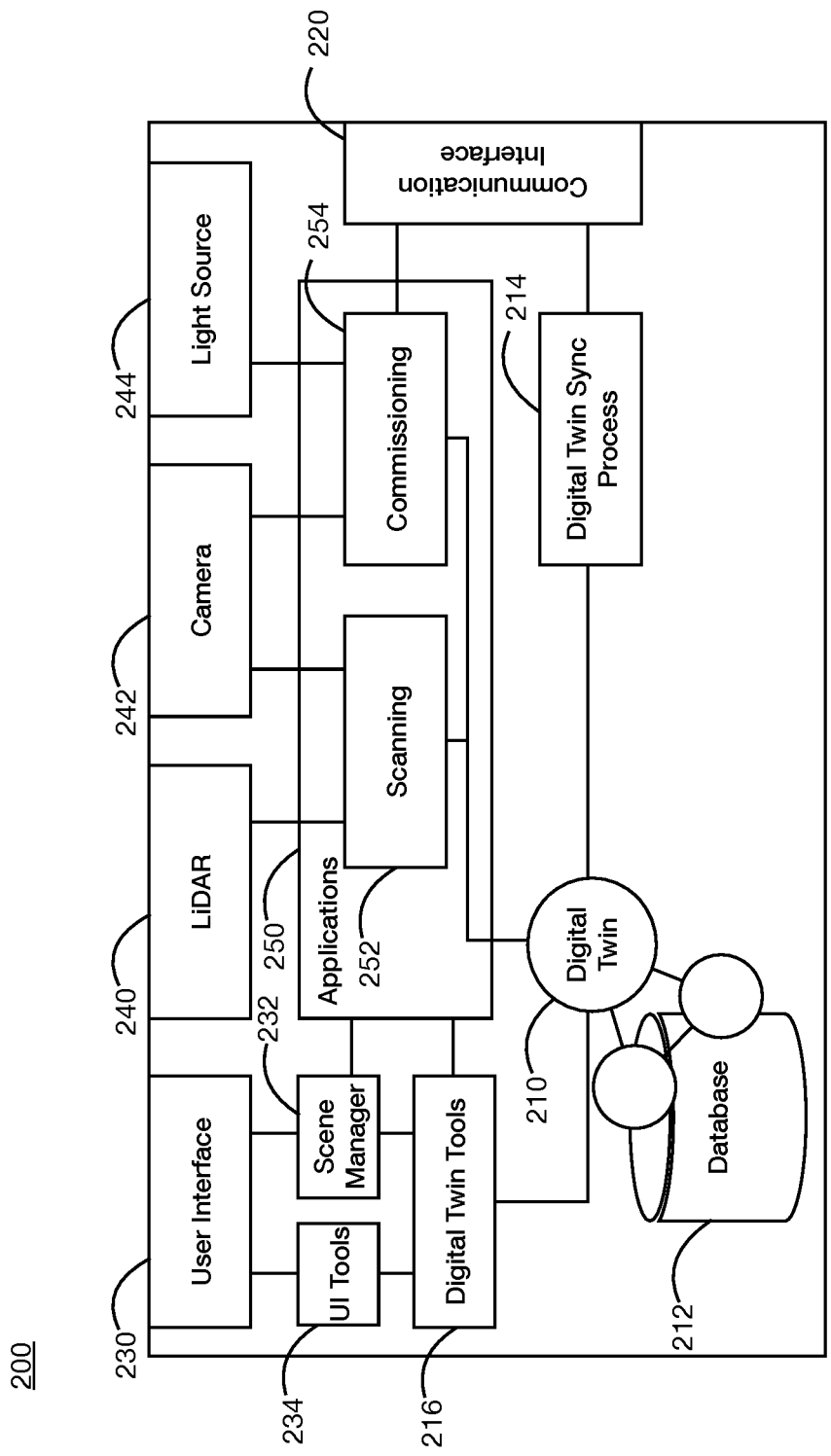
FIG. 2 illustrates an example device for implementing a digital twin mobile suite.

FIG. 2 illustrates an example device for implementing a digital twin mobile suite 200. The digital twin mobile device 200 may correspond to the device that provides digital twin mobile suite 130 and, as such, may provide a user with access to one or more applications for interacting with a digital twin. According to various embodiments, the digital twin mobile device 200 is a mobile device such as a mobile phone or a tablet.

The digital twin application device 200 includes a digital twin 210, which may be stored in a database 212. The digital twin 210 may correspond to the digital twin 120 or a portion thereof (e.g., those portions relevant to the applications provided by the digital twin mobile device 200). The digital twin 210 may be used to drive or otherwise inform many of the applications provided by the digital twin mobile device 200. A digital twin 210 may be any data structure that models a real-life object, device, system, or other entity. Examples of a digital twin 210 useful for various embodiments will be described in greater detail below with reference to FIG. 3. While various embodiments will be described with reference to a particular set of heterogeneous and omnidirectional neural network digital twins, it will be apparent that the various techniques and embodiments described herein may be adapted to other types of digital twins. In some embodiments, additional systems, entities, devices, processes, or objects may be modeled and included as part of the digital twin 210.

In some embodiments, the digital twin 210 may be created and used entirely locally to the digital twin mobile device 200. In others, the digital twin 210 may be made available to or from other devices via a communication interface 220. The communication interface 220 may include virtually any hardware for enabling connections with other devices, such as an Ethernet network interface card (NIC), WiFi NIC, Bluetooth, or USB connection.

A digital twin sync process 214 may communicate with one or more other devices via the communication interface 220 to maintain the state of the digital twin 210. For example, where the digital twin mobile device 200 creates or modifies the digital twin 210 to be used by other devices, the digital twin sync process 214 may send the digital twin 210 or updates thereto to such other devices as the user changes the digital twin 210. Similarly, where the digital twin mobile device 200 uses a digital twin 210 created or modified by another device, the digital twin sync process 214 may request or otherwise receive the digital twin 210 or updates thereto from the other devices via the communication interface 220, and commit such received data to the database 212 for use by the other components of the digital twin mobile device 200. In some embodiments, both of these scenarios simultaneously exist as multiple devices collaborate on creating, modifying, and using the digital twin 210 across various applications. As such, the digital twin sync process 214 (and similar processes running on such other devices) may be responsible for ensuring that each device participating in such collaboration maintains a current copy of the digital twin, as presently modified by all other such devices. In various embodiments, this synchronization is accomplished via a pub/sub approach, wherein the digital twin sync process 214 subscribes to updates to the digital twin 210 and publishes its own updates to be received by similarly-subscribed devices. Such a pub/sub approach may be supported by a centralized process, such as a process running on a central server or central cloud instance.

A set of digital twin tools 216 may provide various libraries for enabling or enhancing other mobile device 200 component interactions with the digital twin 210. As an example, the digital twin tools may include an introspection library for introspecting the digital twin. This introspection may include simply reading or writing values from the nodes of the digital twin 210, executing sophisticated queries against the digital twin 210 to read or write to values (or groupings thereof) matching the query, or performing transformations of data that is read or written to nodes of the digital twin 210 (e.g., translating between Fahrenheit and Celsius).

The digital twin tools 216 may also provide libraries for leveraging the digital twin 210 for problem solving. In particular, where the digital twin 210 is constructed in a way that it is differentiable in any direction, the digital twin tools 216 may provide libraries for constructing cost functions from the digital twin 210 for different problems and for optimizing such cost functions (e.g., using one or more gradient descent algorithms). As an example, the digital twin tools 216 may enable construction of a cost function that relates various training weights stored in the nodes of the digital twin 210 to how close one or more node predictions come to a ground truth training example. Optimization of the cost function by tuning those training weights may then resemble classical machine learning. As another example, the digital twin tools 216 may enable construction of a cost function that relates orientations or other positional information of various walls (as represented by nodes in the digital twin 210) to a measure of how square the walls are relative to each other. Optimization of the cost function by tuning the positional information of the walls may then enable fine tuning floorplans (as captured in the digital twin 210) to match a user's expectations of square rooms. In this way, the digital twin tools 216 may provide a generalizable problem-solving kit for advanced modification and inference drawing from the digital twin 210. Various additional libraries for inclusion in the digital twin tools 216 for enhancing device 200 component interactions with the digital twin 210 will be apparent.

To enable user interaction with the digital twin 210, the digital twin mobile device 200 includes a user interface 230. For example, the user interface 230 may include a display, a touchscreen, a keyboard, a mouse, or any device capable of performing input or output functions for a user. In some embodiments, the user interface 230 may instead or additionally allow a user to use another device for such input or output functions, such as connecting a separate tablet, mobile phone, or other device for interacting with the digital twin mobile device 200. In such embodiments one or more of the lidar 240, camera 242, or flashlight 244 may instead be disposed on such external device connected via the user interface 230. In some embodiments, the user interface 230 includes a web server that serves interfaces to a remote user's personal device (e.g., via the communications interface). Thus, in some embodiments, the applications provided by the digital twin mobile device 200 may be provided as a web-based software-as-a-service (SaaS) offering.

The user interface 230 may rely on multiple additional components for constructing one or more graphical user interfaces for interacting with the digital twin 210. A scene manager 232 may store definitions of the various interface scenes that may be offered to the user. As used herein, an interface scene will be understood to encompass a collection of panels, tools, and other GUI elements for providing a user with a particular application (or set of applications). For example, separate sets interface scenes may be defined for enabling interaction with a scanning application and commissioning application. It will be understood that various customizations and alternate views may be provided to a particular interface scene without constituting an entirely new interface scene. For example, panels may be rearranged, tools may be swapped in and out, and information displayed may change during operation without fundamentally changing the overall application provided to the user via that interface scene.

The UI tool library 234 stores definitions of the various tools that may be made available to the user via the user interface 230 and the various interface scenes (e.g., by way of a selectable interface button). These tool definitions in the UI tool library 234 may include software defining manners of interaction that add to, remove from, or modify aspects of the digital twin. As such, tools may include a user-facing component that enables interaction with aspects of the user interface scene, and a digital twin-facing component that captures the context of the user's interactions and instructs the digital twin tools 216 to make appropriate modifications to the digital twin 210.

The digital twin mobile device 200 includes both a LiDAR device 240 and a camera 242 for capturing information about the surrounding environment. The camera 242 may be capable of capturing image information such as still images or video. The LiDAR device 240 is a light detection and ranging device for gathering depth information about the environment. As such, the LiDAR device 240 may emit light (e.g., infrared light) and measure the time it takes for the reflection to be received at a sensor. This time may then be converted to a distance (i.e., a depth), indicating how far away a surface is from the device 200. It will be apparent that other technologies may be used for gathering or otherwise sensing depth information about the environment including applications of radar, sonar, or even advanced image processing (e.g., recognizing shadows in images or relative movements of objects in video captured by the camera 242). The digital twin mobile device 200 also includes a light source 244, such as a photodiode used for illuminating a subject for the camera 242 to capture or for operating by the user as a flashlight. The light source 244 may be controllable by other components of the device 200 and may offer configurable levels of illumination.

To use the various other components of the device to provide the functionalities described herein, the device 200 may include one or more applications 250. In some embodiments, the applications 250 may be each be provided as separate "apps" downloadable from a marketplace and separately launchable by the user. In other embodiments, the applications 250 may instead be libraries of a single "app" or other collected suite of software. For example, the software elements 210-216, 230-243, 250-254 may be included as a single app.

A scanning application 252 may enable the user to scan an environment such that its structure is captured and converted into a digital twin 210 (or portion thereof or update thereto). The scanning application 252 may utilize the LiDAR and positional information (e.g., GPS information provided by the communication interface or positional information provided by an accelerometer, not shown) to generate a 3D surface representative of the device's 200 surroundings. The scanning application 252 then further digests this 3D surface information into simplified descriptions of the surrounding environment. For example, the scanning application 252 may identify substantially planar surfaces in the 3D surface information and designate these as walls having particular location, dimensions, and other information. These descriptions may then be in a form suitable for commitment by the scanning application 252 to the digital twin 210 (e.g., using one or more libraries provided by the digital twin tools 216). In a similar manner, the scanning application 252 may include additional functionality for extracting door, window, object, and other data from the 3D scan data produced by the LiDAR device 240.

The scanning application 252 functionality may be supplemented by user interaction, e.g., via the user interface 230. For example, where a current scene (as managed by the scene manager 232) specifies that a live image and minimap is to be provided to the user, the scanning application 252 may provide image data from the camera 242 and a minimap rendered from the current scan (e.g., as may be already partially captured in the digital twin) to the scene manager 232 for presentation via the user interface 230. The scanning application 252 may also identify one or more UI tools 234 to present to the user for enabling interaction with the scanning process. For example, a UI tool 234 may enable a user to virtually "draw" on the live image to identify a wall surface or the boundaries of a window or door. Such information may further inform the operation of the scanning application 252 in interpreting the 3D scan data from the LiDAR device 240. As another example, a UI tool 234 may enable a user to add a virtual tag to the environment. This virtual tag may be stored with positional information (e.g., the current position of the device or the position targeted by the user in the 3D scan data), image information (e.g., as captured from the camera 242), textual information (e.g., as entered by the user), or other information for storage in the digital twin 210 and, thus, later use by a downstream application.

The commissioning application 254 may enable the user to commission devices installed in the environment. In particular, the commissioning application 254 may use descriptions of the devices installed in the environment stored in the digital twin 210 to identify what devices exist to be commissioned, where those devices are located in the environment, how to communicate with those devices, what commissioning procedures are to be performed (e.g., what tests are relevant and what the passing criteria are), etc. To begin commissioning processes, in some embodiments, the device first needs to be near the device. To guide the user in achieving sufficient proximity, the commissioning application 254 may instruct the scene manager 232 to display various feedback such as textual instructions or a live image captured by the camera 242 with augmented reality or other UI features to direct the user appropriately. When ready to begin a commissioning procedure, the commissioning application 254 may initiate communication with the device via the communication interface (e.g., using the Bluetooth protocol). In some embodiments, such as those where the device is initially expected to be powered off or otherwise unable to communicated via the communications interface 220, the commissioning application 254 may first cause the device to be powered on by instructing the user to take manual action or by controlling the light source 244 to cause the device to turn on. For example, in some embodiments, a device may include a photovoltaic sensor configured to power the device on in response to one or more pulses of light producible by the light source 244. In some embodiments, the commissioning application 254 may also encode a message for passage via the light source 244 and delivery to the device such as, for example, a security key to be used in establishing communication via the communication interface 220. Once communication is established, the commissioning application 254 may pass messages back and forth with the device (and potentially other devices, such as a controller) to test and verify proper installation. If there is a problem, the commissioning application 254 may display a message indicating such to the user via the scene manager 232 and user interface 230.

Figure 3:
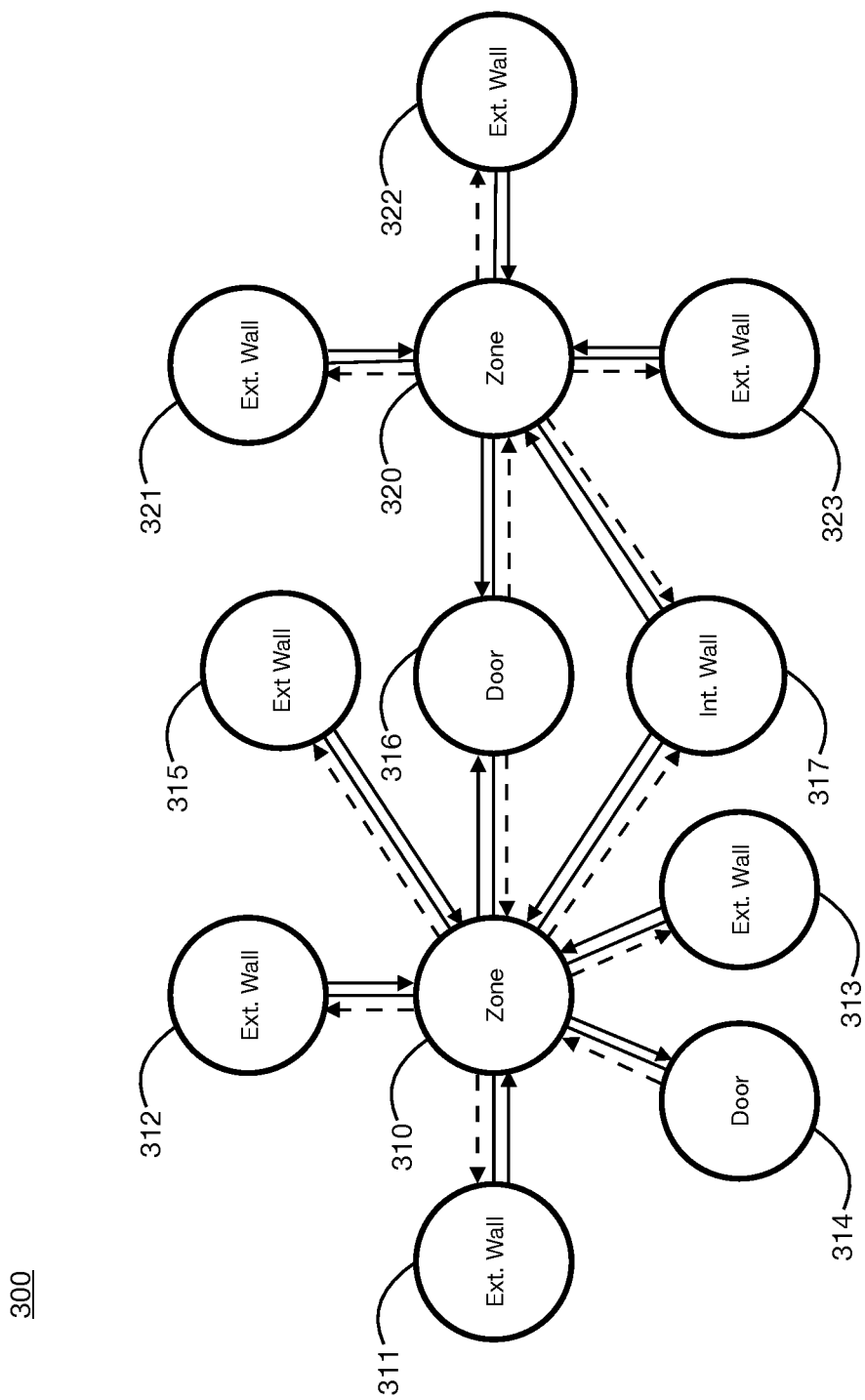
FIG. 3 illustrates an example digital twin for construction by or use in various embodiments.

FIG. 3 illustrates an example digital twin 300 for construction by or use in various embodiments. The digital twin 300 may correspond, for example, to digital twin 120 or digital twin 210. As shown, the digital twin 300 includes a number of nodes 310, 311, 312, 313, 314, 315, 316, 320, 321, 322, 323 connected to each other via edges. As such, the digital twin 300 may be arranged as a graph, such as a neural network. In various alternative embodiments, other arrangements may be used. Further, while the digital twin 300 may reside in storage as a graph type data structure, it will be understood that various alternative data structures may be used for the storage of a digital twin 300 as described herein. The nodes 310-323 may correspond to various aspects of a building structure such as zones, walls, and doors. The edges between the nodes 310-323 may, then, represent relationships between the aspects represented by the nodes 310-323 such as, for example, adjacency for the purposes of heat transfer.

As shown, the digital twin 300 includes two nodes 310, 320 representing zones. A first zone node 310 is connected to four exterior wall nodes 311, 312, 313, 315; two door nodes 314, 316; and an interior wall node 317. A second zone node 320 is connected to three exterior wall nodes 321, 322, 323; a door node 316; and an interior wall node 317. The interior wall node 317 and door node 316 are connected to both zone nodes 310, 320, indicating that the corresponding structures divide the two zones. This digital twin 300 may thus correspond to a two-room structure.

It will be apparent that the example digital twin 300 may be, in some respects, a simplification. For example, the digital twin 300 may include additional nodes representing other aspects such as additional zones, windows, ceilings, foundations, roofs, or external forces such as the weather or a forecast thereof. It will also be apparent that in various embodiments the digital twin 300 may encompass alternative or additional systems such as controllable systems of equipment (e.g., HVAC systems).

According to various embodiments, the digital twin 300 is a heterogenous neural network. Typical neural networks are formed of multiple layers of neurons interconnected to each other, each starting with the same activation function. Through training, each neuron's activation function is weighted with learned coefficients such that, in concert, the neurons cooperate to perform a function. The example digital twin 300, on the other hand, may include a set of activation functions (shown as solid arrows) that are, even before any training or learning, differentiated from each other, i.e., heterogenous. In various embodiments, the activation functions may be assigned to the nodes 310-323 based on domain knowledge related to the system being modeled. For example, the activation functions may include appropriate heat transfer functions for simulating the propagation of heat through a physical environment (such as function describing the radiation of heat from or through a wall of particular material and dimensions to a zone of particular dimensions). As another example, activation functions may include functions for modeling the operation of an HVAC system at a mathematical level (e.g., modeling the flow of fluid through a hydronic heating system and the fluid's gathering and subsequent dissipation of heat energy). Such functions may be referred to as "behaviors" assigned to the nodes 310-323. In some embodiments, each of the activation functions may in fact include multiple separate functions; such an implementation may be useful when more than one aspect of a system may be modeled from node-to-node. For example, each of the activation functions may include a first activation function for modeling heat propagation and a second activation function for modeling humidity propagation. In some embodiments, these diverse activation functions along a single edge may be defined in opposite directions. For example, a heat propagation function may be defined from node 310 to node 311, while a humidity propagation function may be defined from node 311 to node 310. In some embodiments, the diversity of activation functions may differ from edge to edge. For example, one activation function may include only a heat propagation function, another activation function may include only a humidity propagation function, and yet another activation function may include both a heat propagation function and a humidity propagation function.

According to various embodiments, the digital twin 300 is an omnidirectional neural network. Typical neural networks are unidirectional—they include an input layer of neurons that activate one or more hidden layers of neurons, which then activate an output layer of neurons. In use, typical neural networks use a feed-forward algorithm where information only flows from input to output, and not in any other direction. Even in deep neural networks, where other paths including cycles may be used (as in a recurrent neural network), the paths through the neural network are defined and limited. The example digital twin 300, on the other hand, may include activation functions along both directions of each edge: the previously discussed "forward" activation functions (shown as solid arrows) as well as a set of "backward" activation functions (shown as dashed arrows).

In some embodiments, at least some of the backward activation functions may be defined in the same way as described for the forward activation functions-based on domain knowledge. For example, while physics-based functions can be used to model heat transfer from a surface (e.g., a wall) to a fluid volume (e.g., an HVAC zone), similar physics-based functions may be used to model heat transfer from the fluid volume to the surface. In some embodiments, some or all of the backward activation functions are derived using automatic differentiation techniques. Specifically, according to some embodiments, reverse mode automatic differentiation is used to compute the partial derivative of a forward activation function in the reverse direction. This partial derivative may then be used to traverse the graph in the opposite direction of that forward activation function. Thus, for example, while the forward activation function from node 311 to node 310 may be defined based on domain knowledge and allow traversal (e.g., state propagation as part of a simulation) from node 311 to node 310 in linear space, the reverse activation function may be defined as a partial derivative computed from that forward activation function and may allow traversal from node 310 to 311 in the derivative space. In this manner, traversal from any one node to any other node is enabled—for example, the graph may be traversed (e.g. state may be propagated) from node 312 to node 313, first through a forward activation function, through node 310, then through a backward activation function. By forming the digital twin as an omnidirectional neural network, its utility is greatly expanded; rather than being tuned for one particular task, it can be traversed in any direction to simulate different system behaviors of interest and may be "asked" many different questions.

According to various embodiments, the digital twin is an ontologically labeled neural network. In typical neural networks, individual neurons do not represent anything in particular; they simply form the mathematical sequence of functions that will be used (after training) to answer a particular question. Further, while in deep neural networks, neurons are grouped together to provide higher functionality (e.g. recurrent neural networks and convolutional neural networks), these groupings do not represent anything other than the specific functions they perform; i.e., they remain simply a sequence of operations to be performed.

The example digital twin 300, on the other hand, may ascribe meaning to each of the nodes 310-323 and edges therebetween by way of an ontology. For example, the ontology may define each of the concepts relevant to a particular system being modeled by the digital twin 300 such that each node or connection can be labeled according to its meaning, purpose, or role in the system. In some embodiments, the ontology may be specific to the application (e.g., including specific entries for each of the various HVAC equipment, sensors, and building structures to be modeled), while in others, the ontology may be generalized in some respects. For example, rather than defining specific equipment, the ontology may define generalized "actors" (e.g., the ontology may define producer, consumer, transformer, and other actors for ascribing to nodes) that operate on "quanta" (e.g., the ontology may define fluid, thermal, mechanical, and other quanta for propagation through the model) passing through the system. Additional aspects of the ontology may allow for definition of behaviors and properties for the actors and quanta that serve to account for the relevant specifics of the object or entity being modeled. For example, through the assignment of behaviors and properties, the functional difference between one "transport" actor and another "transport" actor can be captured.

The above techniques, alone or in combination, may enable a fully-featured and robust digital twin 300, suitable for many purposes including system simulation and control path finding. The digital twin 300 may be computable and trainable like a neural network, queryable like a database, introspectable like a semantic graph, and callable like an API.

As described above, the digital twin 300 may be traversed in any direction by application of activation functions along each edge. Thus, just like a typical feedforward neural network, information can be propagated from input node(s) to output node(s). The difference is that the input and output nodes may be specifically selected on the digital twin 300 based on the question being asked, and may differ from question to question. In some embodiments, the computation may occur iteratively over a sequence of timesteps to simulate over a period of time. For example, the digital twin 300 and activation functions may be set at a particular timestep (e.g., 1 minute), such that each propagation of state simulates the changes that occur over that period of time. Thus, to simulate longer period of time or point in time further in the future (e.g., one minute), the same computation may be performed until a number of timesteps equaling the period of time have been simulated (e.g., 60 one second time steps to simulate a full minute). The relevant state over time may be captured after each iteration to produce a value curve (e.g., the predicted temperature curve at node 310 over the course of a minute) or a single value may be read after the iteration is complete (e.g., the predicted temperature at node 310 after a minute has passed). The digital twin 300 may also be inferenceable by, for example, attaching additional nodes at particular locations such that they obtain information during computation that can then be read as output (or as an intermediate value as described below).

While the forward activation functions may be initially set based on domain knowledge, in some embodiments training data along with a training algorithm may be used to further tune the forward activation functions or the backward activation functions to better model the real world systems represented (e.g., to account for unanticipated deviations from the plans such as gaps in venting or variance in equipment efficiency) or adapt to changes in the real world system over time (e.g., to account for equipment degradation, replacement of equipment, remodeling, opening a window, etc.).

Training may occur before active deployment of the digital twin 300 (e.g., in a lab setting based on a generic training data set) or as a learning process when the digital twin 300 has been deployed for the system it will model. To create training data for active-deployment learning, a controller device (not shown) may observe the data made available from the real-world system being modeled (e.g., as may be provided by a sensor system deployed in the environment 110) and log this information as a ground truth for use in training examples. To train the digital twin 300, that controller may use any of various optimization or supervised learning techniques, such as a gradient descent algorithm that tunes coefficients associated with the forward activation functions or the backward activation functions. The training may occur from time to time, on a scheduled basis, after gathering of a set of new training data of a particular size, in response to determining that one or more nodes or the entire system is not performing adequately (e.g., an error associated with one or more nodes 310-323 passed a threshold or passes that threshold for a particular duration of time), in response to manual request from a user, or based on any other trigger. In this way, the digital twin 300 may be adapted to better adapt its operation to the real world operation of the systems it models, both initially and over the lifetime of its deployment, by tacking itself to the observed operation of those systems.

The digital twin 300 may be introspectable. That is, the state, behaviors, and properties of the 310-323 may be read by another program or a user. This functionality is facilitated by association of each node 310-323 to an aspect of the system being modeled. Unlike typical neural networks where, due to the fact that neurons don't represent anything particularly the internal values are largely meaningless (or perhaps exceedingly difficult or impossible to ascribe human meaning), the internal values of the nodes 310-323 can easily be interpreted. If an internal "temperature" property is read from node 310, it can be interpreted as the anticipated temperature of the system aspect associated with that node 310.

Through attachment of a semantic ontology, as described above, the introspectability can be extended to make the digital twin 300 queryable. That is, ontology can be used as a query language usable to specify what information is desired to be read from the digital twin 300. For example, a query may be constructed to "read all temperatures from zones having a volume larger than 200 square feet and an occupancy of at least 1." A process for querying the digital twin 300 may then be able to locate all nodes 310-323 representing zones that have properties matching the volume and occupancy criteria, and then read out the temperature properties of each. The digital twin 300 may then additionally be callable like an API through such processes. With the ability to query and inference, canned transactions can be generated and made available to other processes that aren't designed to be familiar with the inner workings of the digital twin 300. For example, an "average zone temperature" API function could be defined and made available for other elements of the controller or even external devices to make use of. In some embodiments, further transformation of the data could be baked into such canned functions. For example, in some embodiments, the digital twin 300 itself may not itself keep track of a "comfort" value, which may defined using various approaches such as the Fanger thermal comfort model. Instead, e.g., a "zone comfort" API function may be defined that extracts the relevant properties (such as temperature and humidity) from a specified zone node, computes the comfort according to the desired equation, and provides the response to the calling process or entity.

It will be appreciated that the digital twin 300 is merely an example of a possible embodiment and that many variations may be employed. In some embodiments, the number and arrangements of the nodes 310-323 and edges therebetween may be different, either based on the device implementation or based on the system being modeled. For example, a controller deployed in one building may have a digital twin 300 organized one way to reflect that building and its systems while a controller deployed in a different building may have a digital twin 300 organized in an entirely different way because the building and its systems are different from the first building and therefore dictate a different model. Further, various embodiments of the techniques described herein may use alternative types of digital twins. For example, in some embodiments, the digital twin 300 may not be organized as a neural network and may, instead, be arranged as another type of model for one or more components of the environment 110. In some such embodiments, the digital twin 300 may be a database or other data structure that simply stores descriptions of the system aspects, environmental features, or devices being modeled, such that other software has access to data representative of the real world objects and entities, or their respective arrangements, as the software performs its functions.

FIG. 4A illustrates a first example user interface scene 400a for scanning an environment. This user interface 400a may be provided as part of a scanning application and, as such, may be presented as an arrangement of UI tools 234 and other elements by the scene manager 232, as instructed by the scanning application 252. Thus, the user interface scene 232 may be presented to the user on a user interface 230 of the device 200. The user interface scene 232 may be presented for purposes of, among other things, scanning a room or other physical structure into a digital twin representing that physical space. As such, the user may have previously provided a command to begin the scan of a new room, to resume a previously-started scan, or some other command indicating that the scanning process is to be performed. In some situations, the digital twin may not be complete or may not yet have been created before the scanning process is commenced; as such, the digital twin underlying the scan and tagging processes may be a work in progress, incomplete, or otherwise subject to further modification by these processes or other processes performed by the device 200 or other devices (not shown) operating on the shared digital twin. As the user moves or reorients the device 200, the LiDAR sensor 240 continues to gather 3D data of the surrounding geometry, that may later be digested into a digital twin, such as a collection of nodes representing the zone, walls, window, doors, etc. of the room being scanned.

The user interface scene 232 includes a representation of a physical space; in particular it shows a live image 410 captured by the camera 242 of the device 200. As will be understood, the live image 410 may be "live" in the sense that it has been presently captured by the camera 242 and then displayed during the scan session or while the device 200 remains in the same vicinity where the image capture was performed, rather than being a still image captured at some previous time and loaded later. In some such embodiments, the live image 410 is continually updated with new data from the camera 242 as the user changes the orientation or position of the device within the physical space. Thus, the live image 410 may appear to animate, so as to always show an image of the physical space the camera is currently pointed toward. As shown, the live image presently captures image representations of multiple structures and objects in the physical space, including an image representation of a computer monitor 415.

The user interface scene 400a includes multiple user interface elements overlaid on the live image 410. As shown, the user interface scene 400a shows a minimap 420 similar to the previously-described minimap 160. A tutorial button 422 may, when tapped by the user, initiate a tutorial process instructing the user how to use the scanning application. A finish button 424 may, when tapped by the user, cause the device 200 to exit the current interface scene 400a or end the current scanning process. At this point, the captured 3-dimensional data may be digested into a form suitable for storage in the digital twin. An undo button 426 may, when tapped by the user, reverse the effects of one or more actions previously taken by the user. For example, where the user has swiped on a wall of the live image to instruct the device how to interpret that wall (e.g., as a single plane), the undo button 426 may reverse this command. An add button 430 may, when tapped by the user, provide additional options for the user to add different objects to the digital twin.

FIG. 4B illustrates a second example user interface scene 400b for receiving a user tag command. This user interface scene 400b may correspond mostly to the user interface scene 400a and may be display in response to the user selecting the add button 430. As shown, additional buttons have been overlaid on the live image 410. An add room button 432 may, when selected by the user, indicate that a new room scan should be commenced. If another scan was already in progress, this action may digest the current scan data into a digital twin (e.g., a zone node and multiple connected wall nodes) to be committed to the larger digital twin 210. The device 200 may then begin collecting a new set of 3d scan data to be similarly digested at a later point in time.

An add sensor button 434 may, when selected by the user, indicate that a sensor should be added to the digital twin. For example, a node representing the new sensor may be attached to the zone node of the current room's digital twin or information representative of the new sensor may be added to the zone node itself. Likewise, an add controller button 436 may, when selected by the user, indicate that a controller should be added to the digital twin. For example, a node representing the new controller may be attached to the zone node of the current room's digital twin or information representative of the new controller may be added to the zone node itself. While these two buttons 434, 436 may allow for the user to input commands for addition of certain classes of predetermined objects to the digital twin (i.e., sensors and controllers), the user interface 400b may also provide a generalized method for adding other objects desired by the user. Thus, an add object button may, when selected by the user, indicate than an general object should be added to the digital twin. For example, a node representing the new object may be attached to the zone node of the current room's digital twin or information representative of the new object may be added to the zone node itself.

In some embodiments, the user interface scene 400b when adding a controller, sensor, or other object, enable the user to capture additional details about the object. For example, the user interface scene 400b may enable the user to position the object in view of the camera such that a location of that object can be recorded into the digital twin (rather than a general notion of the object being located somewhere within the current zone being scanned). As shown, the user interface scene 400b includes a reticle 440 to assist the user in properly positioning the object within the view of the camera such that location information can be ascertained. For example, in some embodiments, when the user inputs a command to tag a new object by selecting one of the buttons 434, 436, 438, the LiDAR sensor 240 (or other depth sensor) may be used to determine a distance from the device 200 to the nearest surface inside the reticle 440. Thus, the position of reticle or the LiDAR sensor 240 may be positioned or calibrated such that the gathered distance information will coincide with the visualized reticle. Alternatively, image or video processing may be applied to the data defining the live image 410 to determine a distance to the object within the reticle 440. Once the distance is determined, the current position and orientation of the device 200 can be used to determine a location in 3D space for the new object. This information may then be added to the digital twin as well for use in future renderings of the tag and other applications.

In some embodiments, the object being added to the digital twin may not be visible to the camera but may nonetheless be considered within the current view of the camera. For example, an object may be positioned within a wall that is currently visible in the camera. As such, the object may be added with the location of the wall within the reticle 440 at the time the user issues the command to add the object. The use of such a point on the outer surface of the wall as a proxy for an object within the wall may be sufficient for various downstream applications. In some embodiments, the user may be able to further adjust this location for greater accuracy by, for example, indicating that a certain additional depth should be added in locating the object (e.g., to account for the width of the wall panel) or by manually repositioning the object tag in a later rendering on the device 200 or another device (not shown) operating on the shared digital twin.

FIG. 4C illustrates a third example user interface scene 400c for tagging an object. This interface scene 400c may enable the user to input additional information about an object as it is added to the digital twin as a tag. This user interface scene 400c may be particularly useful for tagging general objects in response to user selection of the add object button 438 of the user interface 400b. As shown, the user interface scene 400c displays an image 450 including a representation of the object to be tagged 455. The image 450 may be a static image that does not update as the device 200 is moved. In some embodiments, the image 450 is captured from the camera at the time the user selects the add object button and may serve as an avatar to represent the object within the digital twin 200.

Various UI objects may enable the user to provide additional information to store with the object tag, such as a label to represent the type of object or the object's identity. For example, a series of buttons may allow the user to select a preset label including a "Chiller" button 460, a "Desk" button 461, a "Fan" button 462, a "Chair" button 463, a "Light Switch" button 464, a "Mirror" button 465, a "Monitor" button 466, and a "Dishwasher" button 467. A page tracker 468 may indicate that the user may access additional similar label buttons by swiping left or right. Where the user wishes to provide label that is not pre-defined, the user may use the custom label field 470 to enter the desired text for the label (e.g., using the soft keyboard provided by an operating system of the device 200), and then commit the label with the accept button 472. This functionality may enable the user to, e.g., provide labels for types of object not already predefined or to provide unique names to each object (e.g., "Monitor 1," "Monitor 2," etc.). Instead of typing in such a label, the user may indicate a desire to record their voice to input a label by selecting the microphone button 474. After recording the user's voice (or other sound), the recording may be used as an audio label or may be converted using speech-to-text to a textual label, displayed in the custom label field 470 for user verification or correction. If the user wishes to cancel object tagging (e.g., after seeing that the image 450 is not as desired), the user may select a back button 480 to return to an earlier interface scene 400a,b. In the present case, as the represented object 455 is a monitor, the user may select the "Monitor" button 466 to indicate that the textual label "Monitor" should be associated with the other tag information (e.g., the image 450 and determined object location) in the digital twin 200.

FIG. 4D illustrates a fourth example user interface scene 400d for displaying an indication of a tag. This user interface scene 400d may be displayed in response to the user selecting a label on user interface scene 400c and, as such, may in effect represent a resumption of a scanning process paused for the purpose of tagging an object and a return to the user interface 400a (now driven additionally by the presence of a tag). Alternatively, the user interface scene 400d may be displayed at a later time, such as at a later date where scanning has been completed, but the user wishes to locate or otherwise view one or more previously-created object tags in an augmented-reality environment. Thus, the user interface scene 400d may in some embodiments be presented by a different device from the device that presented the previous user interface scenes 400a-c, so long as the device has access to the shared digital twin 120.

In addition to previously described elements, the user interface scene 400d overlays various indicators 490, 495 of a previously-created tag on the live image 410. A simple icon 490 may be overlaid at the location previously captured for the tag to indicate the presence of the tag. A detailed popup 495 may alternatively or additionally be overlaid at the position to communicate additional information about the tag, such as the label input by the user or the still image previously captured. In some embodiments, only the icon 490 may be initially displayed. Upon selection of the icon 490 by the user, the detailed popup 495 may then be displayed.

In some embodiments, the detailed popup 495 may include information other than or in addition to the information provided by the user at the time of tagging. In some such embodiments, another user (or the same user) using another device with access to the shared digital twin may use an application to supplement the tag with information. For example, a user may add detail information such a brand, a device model, an owner, configuration information, etc. for a tag corresponding to the monitor corresponding to the image representation 415. In some embodiments, the digital twin may include live information about the tagged object stored in the digital twin by another device, such as a building controller or the object itself (e.g., where the object is an internet-of-things or other connected device capable of identifying itself in the shared digital twin). For example, a status or other operating parameter of the object may be stored in the digital twin with the tag and then displayed in the detailed popup 495. To enable a controller or other device to recognize the logical association between the tag and an object with which it is in communication such that the controller can begin adding such live data to the tag in the shared digital twin 120, a commissioning process may be employed to create that logical association. For example, in some embodiments, the commissioning application 254 may communicate with the real world object represented by a tag to instruct that device to send the tag or identifier associated therewith to the controller. As another example, the commissioning application 254 may communicate with the real world object represented by a tag to obtain an identifier of the object and send this identifier to the controller. Various other methods for instructing a controller that the tag is associated with a particular object with which the controller communicates will be apparent. After such association is complete, the controller may proceed to continually update one or more pieces of live information for that device in the tag of the shared digital twin 120.

To identify the appropriate location on the live image 410 for displaying the indicators 490, 495, the device 200 may make use of its current location and orientation to identify which points in 3D space are within the camera's 242 field of view. When the location of the tag is in the field of view, the 3D point is translated to a 2D point within the live image 410, where the indicators 490, 495 will be displayed. In some embodiments, at least one of the indicators 490, 495 is scaled based on the distance of the 3D point from the device 200 (e.g., scaled smaller when the point is further away). In some embodiments where the live image 410 is continually updated as the device 200 moves, this process of identifying tag locations in the field of view, translating tag locations to a 2D point in the live image, and overlaying the indicators 490,495 at the 2D point may also be continually performed. In this manner, the indicators 490, 495 may appear to move with the live image 410, thus providing an augmented reality view of the user's surroundings.

In some embodiments, the real-world object corresponding to a tag may not be visible but nonetheless within the camera's field of view. For example, the real-world object may be located inside a wall, having been tagged before the wall was built or having been tagged by a user with knowledge of the object's location within the wall. In such instances, the indicators 490, 495 may be displayed at the point of the wall or other obstructing object or structure behind which the tagged object is understood by the digital twin to reside.

Figure 5:
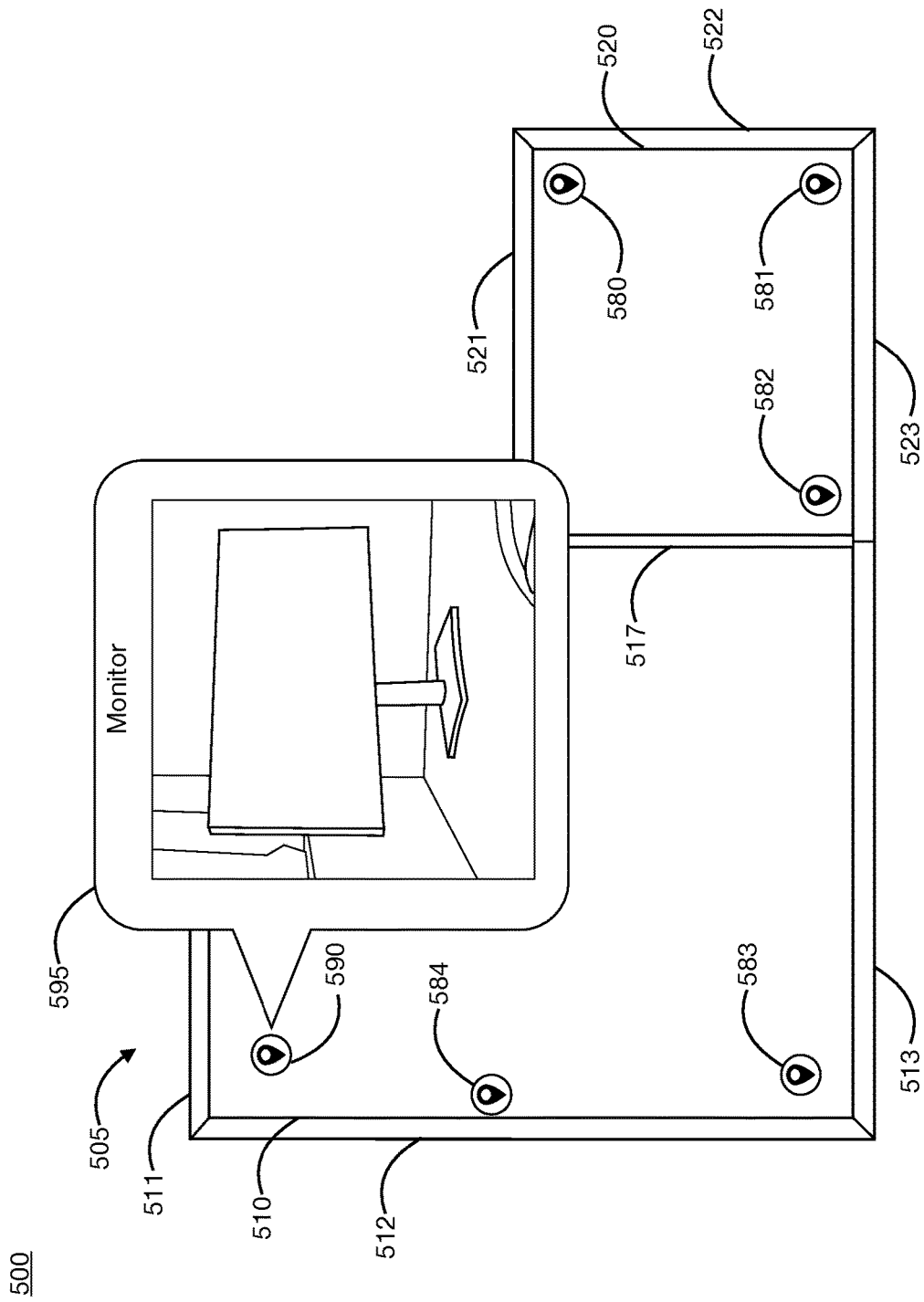
FIG. 5 illustrates an alternative example user interface scene for displaying an indication of a tag.

FIG. 5 illustrates an alternative example user interface scene 500 for displaying an indication of a tag. The user interface scene 500 may be presented by the mobile device 200 implementing the scanning and commissioning applications or may be presented by some other device with access to the shared digital twin 120, such as a device providing additional types of applications for modifying or interacting with a digital twin. In some embodiments, the user interface scene 500 may represent only part of a full interface scene; for example the user interface scene 500 may be a single pane or workspace of a multi-pane interface scene. Such an encompassing interface scene may include additional UI elements such as a navigation bar, tools for interacting with the elements of the scene 500, and informational panels capable of displaying detailed textual or other information descriptive of the elements of the scene 500.

The interface scene 500 includes a representation of the physical space associated with the digital twin 120. In this case, rather than a live image (as in the case of the previously described scenes 400a,b,d), this representation is a rendering 505 of the digital twin 120. In particular, the organization of various nodes representing physical structures (e.g., zones and walls) as well as properties stored in such nodes (e.g., location and dimensions) may provide sufficient information to render a 2D or 3D representation of the physical space modeled by the digital twin 120. As shown, the rendering 505 is a 2D floor plan rendering of a single floor consisting of two rooms. This rendering 505 may be driven by the digital twin 300 which, likewise, described a structure including two adjacent rooms. The rendering 505 includes two zone renderings 510, 520 (which may correspond and be driven by dimension and location properties of zone nodes 310, 320) and wall renderings 511, 512, 513, 517, 521, 522, 523 (which may correspond and be driven by dimension and location properties of wall nodes 311, 312, 313, 317, 321, 322, 323). Additional structures, such as a rendering of wall node 315, may be rendered but currently occluded by other interface elements (e.g., detailed popup 595). In various embodiments, additional structures may be rendered as part of the rendering such as doors (e.g., driven by the door nodes 314, 316). In various embodiments, the user may be provided with one or more controls for altering the rendering 505 or the display thereof such as controls for panning, zooming, or rotating the view of the rendering 505; controls for changing the portion of the digital twin 120 that is rendered (e.g., by changing the floor or floors to be rendered); or controls for changing how the digital twin 120 is rendered (e.g., by switching between 2D and 3D renderings, or single floor and multi-floor renderings).

The user interface scene 500 includes multiple indicators of tags stored in the digital twin 120. In particular, the digital twin 300 may include six previously-created tags and, as such, six tag icons 580, 581, 582, 583, 584, 590 may be displayed at locations in the rendering 505 corresponding to the locations associated with those tags. Upon selection of a tag icon 580, 581, 582, 583, 584, 590, a detailed popup 595 may be displayed as another indication of the tag. The detailed popup 595 may include information such as that described with respect the detailed popup 495. Thus, the user may click through the tag icons 580, 581, 582, 583, 584, 590 to explore the different tags associated with the structure modeled by the digital twin 120. In some embodiments, the user may modify such tags by, for example, dragging a tag icon 580, 581, 582, 583, 584, 590 to a new location (driving an update to the location associated with the tag in the digital twin 120) or modifying a label in a detailed popup 595 (driving a change to the label associated with the tag in the digital twin).

Various other functionalities may be provided in conjunction with the user interface scene 500. For example, an interface for querying the tags in the digital twin 120 may be provided to the user. Various query language may be used to construct a query to identify tags matching one or more criteria (e.g., "All tags with the label 'monitor,'" "All tags with an 'error' status"). Upon executing a query, the device may determine which tags match the query and highlight the corresponding icons, hide icons for those tags not matching the query, display a list of matching tags, or otherwise indicate to the user which tags match the query.

Figure 6:
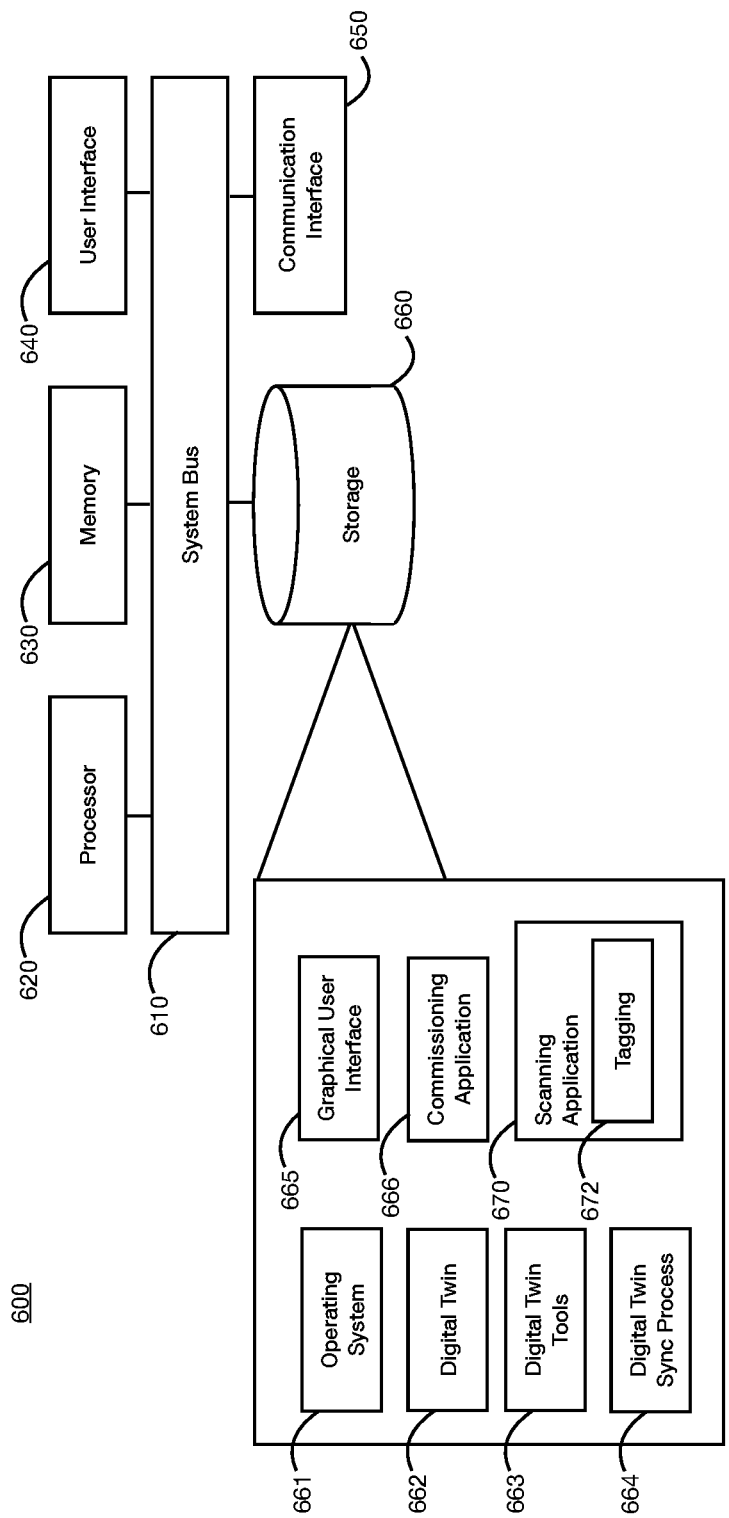
FIG. 6 illustrates an example hardware device for implementing a digital twin mobile device.

FIG. 6 illustrates an example hardware device 600 for implementing a digital twin mobile device. The hardware device 600 may describe the hardware architecture and some stored software of a device providing a digital twin mobile suite 130 or the digital twin mobile device 200. As shown, the device 600 includes a processor 620, memory 630, user interface 640, communication interface 650, and storage 660 interconnected via one or more system buses 610. It will be understood that FIG. 6 constitutes, in some respects, an abstraction and that the actual organization of the components of the device 600 may be more complex than illustrated.

The processor 620 may be any hardware device capable of executing instructions stored in memory 630 or storage 660 or otherwise processing data. As such, the processor 620 may include a microprocessor, field programmable gate array (FPGA), application-specific integrated circuit (ASIC), or other similar devices.

The memory 630 may include various memories such as, for example L1, L2, or L3 cache or system memory. As such, the memory 630 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 640 may include one or more devices for enabling communication with a user such as an administrator. For example, the user interface 640 may include a display, a mouse, a keyboard for receiving user commands, or a touchscreen. In some embodiments, the user interface 640 may include a command line interface or graphical user interface that may be presented to a remote terminal via the communication interface 650 (e.g., as a website served via a web server). In some embodiments, the user interface may include additional hardware or hardware in combination with software such as, for example, a camera, a LiDAR device, or a light source.

The communication interface 650 may include one or more devices for enabling communication with other hardware devices. For example, the communication interface 650 may include a network interface card (NIC) configured to communicate according to the Ethernet protocol. Additionally, the communication interface 650 may implement a TCP/IP stack for communication according to the TCP/IP protocols. Various alternative or additional hardware or configurations for the communication interface 650 will be apparent. In some embodiments, the communication interface 650 may include a radio interface for communicating according to a LTE, 5G, or Bluetooth protocol.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon with the processor 620 may operate. For example, the storage 660 may store a base operating system 661 for controlling various basic operations of the hardware 600.

The storage 660 additionally includes a digital twin 662, such as a digital twin according to any of the embodiments described herein. As such, in various embodiments, the digital twin 662 includes a heterogeneous and omnidirectional neural network. A digital twin tools library 663 may provide libraries for various advanced functionalities with respect to the digital twin 662 such as, for example, introspecting a digital twin (including building of a hypergraph, executing queries, or managing broadcast keypaths); or constructing and optimizing cost functions for problem solving. A digital twin sync process 664 may communicate with other devices via the communication interface 650 to maintain the local digital twin 662 in a synchronized state with digital twins maintained by such other devices. Graphical user interface instructions 665 may include instructions for rendering the various user interface elements for providing the user with access to various applications. As such, the GUI instructions 665 may correspond to one or more of the scene manager 232, UI tool library 234, user interface 230, or portions thereof. Commissioning application instructions 666 may correspond to the commissioning application 254 and, as such, may include instructions for identifying devices from the digital twin 662 for commissioning; guiding a user in the commissioning process, activating and communicating with such devices; or performing other activities related to activation, testing, and installation verification of devices.

Scanning application instructions 670 may correspond to the scanning application 252 and, as such, may include instructions for capturing a surrounding environment and digesting it into the digital twin 662 for use as a building information model, in simulations, and generally by any other applications that have use for the digital twin 662 and structural information modeled thereby. The scanning application instructions 670 may additionally include tagging instructions 672 for enabling a user to create one or more tags for inclusion in the digital twin 662 during the scanning process.

While the hardware device 600 is shown as including one of each described component, the various components may be duplicated in various embodiments. For example, the processor 620 may include multiple microprocessors that are configured to independently execute the methods described herein or are configured to perform steps or subroutines of the methods described herein such that the multiple processors cooperate to achieve the functionality described herein, such as in the case where the device 600 participates in a distributed processing architecture with other devices which may be similar to device 600. Further, where the device 600 is implemented in a cloud computing system, the various hardware components may belong to separate physical systems. For example, the processor 620 may include a first processor in a first server and a second processor in a second server.

Figure 7:
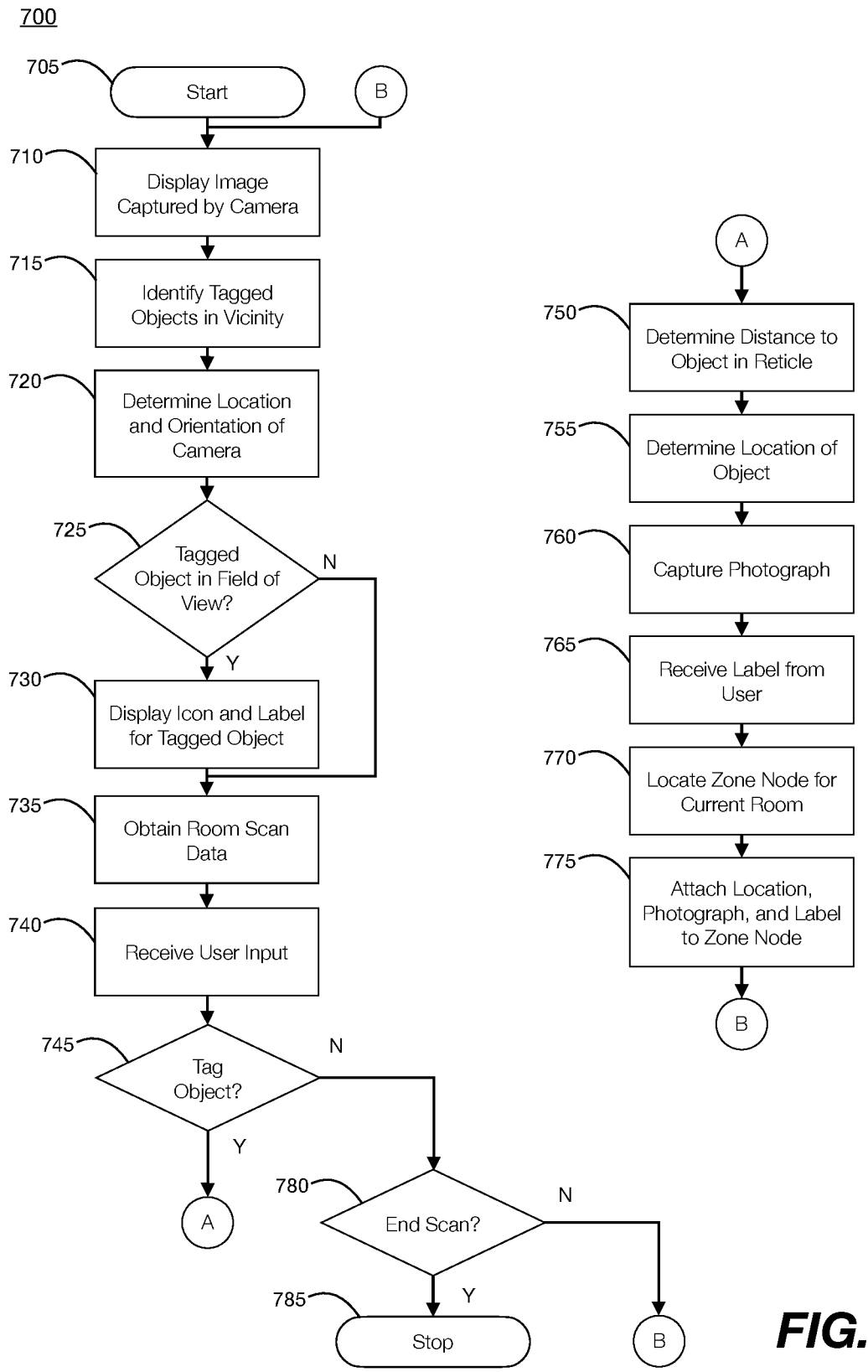
FIG. 7 illustrates an example method for implementing a main loop of a scanning application with object tagging functionality.

FIG. 7 illustrates an example method 700 for implementing a main loop of a scanning application with object tagging functionality. The method 700 may correspond to the scanning application instructions 670 and tagging instructions 672 where those instructions provide a main loop for the applications implemented therein. In other embodiments, applications may be implemented as a collection of federated components operating without any main loop. For example, various functionalities independently implemented in the graphical user interface instructions 665, digital twin tools 663, and scanning application instructions 670 come together to realize a scanning and tagging application. In such embodiments, the method 700 may not correspond to literal implemented instructions, but rather may be descriptive of an example user path through the various connected sets of instructions (e.g., a "trace" through multiple sets of instructions for a particular program flow). Thus, the method 700 may in some respects be a simplification, and additional or alternative steps or step arrangements may be implemented. In various alternative embodiments, the tagging functionality described herein may not be implemented together with a scanning application; various modifications for implementing the tagging functionality steps as a dedicated application or as part of another application will be apparent.

The method 700 begins in step 705, for example, in response to a user input indicating that the scanning application should be initiated. In step 710, the device displays to the user the image data that is presently (or most immediately) captured by the camera. As will be understood, through iterative execution of this step 710 through multiple loops, the displayed image will continually update as the user changes the position or orientation of the device (and consequently, the field of view of the camera). In step 715, the device 200 begins to determine whether and how to display any previously-created tags by determining whether any tagged objects are located in the vicinity of the device. For example, the device 200 may identify the zone in which it currently resides, access the corresponding zone node in the digital twin 210, and create a list of all tags currently associated with that zone node. Next, in step 720, the device 200 determines the current location and orientation of the camera by, e.g., accessing such information from the operating system 661 of the device 200. The device then determines, in step 725, whether any tags from the list identified in step 715 are within the field of view of the camera by, for example, determining for each tag location in the list of tags, whether a ray cast from the device 200 location to the tag location resides within the bounds defined by the current camera orientation and settings (e.g., the field of view) or otherwise determining whether that point lay within the current viewing frustum of the camera. If any such tags are in view of the camera, the device 200 may in step 730 superimpose an indicator of a tag on top of the image, at a 2D point on the live image corresponding to the 3D tag location. Again, various approaches may be used to determine the appropriate 2D point such as identifying the intersection of the previously-descried ray with a viewing plane set for the camera. In some embodiments, the distance from this viewing plane intersection to the intersection with the tag location may be computed and used to inversely scale the appearance of the tag indicator, rending a smaller indicator the further away the device is from the tagged object.

Once any tag indicators are displayed (or if there are no tag indicators to display), the method proceeds to step 730, where the device 200 obtains room scan data for its current location and orientation. In particular, the device 200 may obtain one or more 3d points from the LiDAR sensor 240, representing collisions with some solid object (e.g., a wall, door, furniture, etc.). At this stage, the device 200 may digest some or all of these points into digital twin nodes (or other structures for alternative digital twins), or the device 200 may wait until the user has indicated that the current room scan is finished.

In step 740 the device 200 receives any user input (e.g., activation of a UI element displayed with the live image in step 710). The device 200 begins to interpret the user input in step 745 by determining whether the user input indicates a command to tag an object. It will be apparent that, while a single user input is described herein as sufficient to effect tagging, it will be apparent that in some embodiments a sequence of inputs may be used (e.g., an input to display the reticle and another input to create the tag). Various modifications to the method 700 for achieving such alternative implementation will be apparent.

When the user has provided a command to tag an object, the method 700 proceeds to a tagging subroutine 750-775. In step 750, the device 200 determines a distance to the object currently within the displayed reticle in the live image. In various embodiments, the device 200 may accomplish this by determining a distance using its LiDAR sensor 240. In step 755, the device 200 can use this distance along with the camera location and orientation determined in step 720 to compute a point in 3D space that will serve as the location for the tagged object. In step 760, the device 200 captures a still photograph to serve as a representative image or avatar for the tagged object. The device 200 may accomplish this by, for example, capturing the image data from the currently-displayed live image and then cropping the data to a predetermined frame around where the reticle is displayed. In step 765, the device 200 receives a label from the user. This may be accomplished, e.g., by displaying a new user interface scene, such as user interface scene 400c, to the user for verifying the image captured in step 760 and receiving a textual or other label.

Having captured the data that is to be stored together as an object tag, the device 200 proceeds to update the digital twin so that the tag may be used or further modified later. In step 770, the device 200 locates the digital twin 220 zone node for the current room being scanned. Then, in step 775, the device 200 attaches the tag (including the location, image, and label data) to the zone node. This may include adding such a tag object to the internal properties of the zone node or creating a separate tag node that will be added to the digital twin 220 with a connection to the zone node. Various alternative data arrangements for storing the tag data in association with a room, wall, or other structure will be apparent. After the digital twin 220 has been updated with the new tag, the method 700 loops back to step 710 to continue with the next iteration of the scanning loop.

If, on the other hand, the device 200 determines that the user has not indicated that an object should be tagged in step 745, the method 700 proceeds to step 780 where the device 200 determines whether the user has indicated that the current scan should end. For example, the user may indicate a desire to exit the current scanning application. If so, the method 700 proceeds to end in step 785 (and control may be returned to the operating system or an application selector interface enabling the user to launch other digital twin applications implemented by the device 200). Otherwise, the method 700 loops back to step 710 to continue with the next iteration of the scanning loop.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain example aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the scope of the claims.

I claim:

1. A method for real-world object tagging performed by a processor, comprising:
   receiving, from a user, a command to tag an object currently in view of a camera and located within a physical space;
   in response to the command, determining a distance from a location of the camera to a location of the object;
   determining the location of the object based on the determined distance;
   storing the location of the object and a label together as a tag in a digital twin representing the physical space;
   displaying a representation of the physical space; and
   displaying an indicator of the tag at a location in the representation of the physical space corresponding to the location of the object;
   performing a new scanning process on a previously created object tag during a current scanning process comprising:
      receiving notice that additional information about the object is to be tagged during a scanning process;
      obtaining depth data from the physical space, and
      translating depth data to structure data for storage in the digital twin;
   wherein:
      the current scanning process is paused during the steps of determining the location and storing the tag in the digital twin, and
      the current scanning process is resumed after the step of storing the tag in the digital twin.

2. The method of claim 1, wherein the representation of the physical space is a live image captured by the camera.

3. The method of claim 1, wherein the representation of the physical space is a rendering of the digital twin.

4. The method of claim 1 further comprising:
   in response to the command, capturing an image from image data produced by the camera; and
   storing the image in the digital twin together with the location of the object and the label.

5. The method of claim 1, wherein:
   the digital twin comprises a graph of a plurality of nodes; and
   storing the location of the object and a label together as a tag in a digital twin representing the physical space comprises:

identifying a node of the plurality of nodes corresponding to at least one of:
  an area of the physical space within which the object is located, and
  a structure of the physical space with which the object is in contact, and
storing the tag in association with the identified node.

6. The method of claim 1, wherein displaying the indicator of the tag comprises displaying at least one piece of information previously associated with the tag in the digital twin by a separate device having access to the digital twin.

7. A device for real-world object tagging, comprising:
a user interface;
a camera;
a depth sensor;
a memory storing a digital twin representing a physical space; and
a processor configured to:
receive, via the user interface, a command to tag an object currently in view of the camera and located within the physical space;
in response to the command, determine a distance from a location of the camera to a location of the object using the depth sensor;
determine the location of the object based on the determined distance;
store the location of the object and a label together as a tag in the digital twin;
display a representation of the physical space; and
display an indicator of the tag at a location in the representation of the physical space corresponding to the location of the object;
perform a new scanning process on a previously created object tag during a current scanning process comprising:
  obtain depth data from the physical space, and
  translate depth data to structure data for storage in the digital twin;
wherein:
  the current scanning process is paused during the steps of determining the location and storing the tag in the digital twin, and
  the current scanning process is resumed after the step of storing the tag in the digital twin.

8. The device of claim 7, wherein the representation of the physical space is a live image captured by the camera.

9. The device of claim 7, wherein the representation of the physical space is a rendering of the digital twin.

10. The device of claim 7, wherein the processor is further configured to:
in response to the command, capture an image from image data produced by the camera; and
store the image in the digital twin together with the location of the object and the label.

11. The device of claim 7, wherein:
the digital twin comprises a graph of a plurality of nodes; and
in storing the location of the object and a label together as a tag in a digital twin representing the physical space, the processor is configured to:
identify a node of the plurality of nodes corresponding to at least one of:
  an area of the physical space within which the object is located, and
  a structure of the physical space with which the object is in contact, and
store the tag in association with the identified node.

12. The device of claim 7, further comprising:
in response to the command, capturing an image from image data produced by the camera; and
storing the image in the digital twin together with the location of the object and the label.

13. The device of claim 7, wherein, in displaying the indicator of the tag, the processor is configured to display at least one piece of information previously associated with the tag in the digital twin by a separate device having access to the digital twin.

14. A non-transitory machine-readable medium encoded with instructions for execution by a processor for real-world object tagging performed by a processor, the non-transitory machine-readable medium comprising:
instructions for receiving, from a user, a command to tag an object currently in view of a camera and located within a physical space;
instructions for in response to the command, determining a distance from a location of the camera to a location of the object;
instructions for determining the location of the object based on the determined distance;
instructions for storing the location of the object and a label together as a tag in a digital twin representing the physical space;
instructions for displaying a representation of the physical space; and
instructions for displaying an indicator of the tag at a location in the representation of the physical space corresponding to the location of the object;
instructions for performing a new scanning process during a current scanning process on a previously created object tag comprising:
  instructions for receiving a notice that additional information about the object is to be tagged during a scanning process;
  instructions for obtaining depth data from the physical space,
  instructions for translating depth data to structure data for storage in the digital twin; and
  instructions for pausing the current scanning process during execution of the instructions for determining the location and storing the tag in the digital twin, and
  instructions for resuming the current scanning process after execution of the instructions for storing the tag in the digital twin.

15. The non-transitory machine-readable medium of claim 14, wherein the representation of the physical space is a live image captured by the camera.

16. The non-transitory machine-readable medium of claim 14, wherein the representation of the physical space is a rendering of the digital twin.

17. The non-transitory machine-readable medium of claim 14, further comprising
instructions for, in response to the command, capturing an image from image data produced by the camera.

18. The non-transitory machine-readable medium of claim 14, wherein the instructions for displaying the indicator of the tag comprise instructions for displaying at least one piece of information previously associated with the tag in the digital twin by a separate device having access to the digital twin.

19. The non-transitory machine-readable medium of claim 17 wherein the instructions for storing the location of the object and a label together as a tag in the digital twin comprises instructions for additionally storing the image in the digital twin together with the location of the object and the label.

20. The non-transitory machine-readable medium of claim 14, further comprising locating a zone node for a current room.

\* \* \* \* \*